FIG. I

INVENTORS
ADDISON D. COLE
JOHN B. LEVIN
LEON G. WILDE
VICTOR T. TAKATA

BY *Joseph Weingarten*

ATTORNEY

INVENTORS
ADDISON D. COLE
JOHN B. LEVIN
LEON G. WILDE
VICTOR T. TAKATA

BY Joseph Weingarten
ATTORNEY

FIG. 5

3,007,151
RADAR AIRCRAFT GUIDANCE SYSTEM

Addison D. Cole, Natick, John B. Levin, Boston, Leon G. Wilde, Andover, and Victor T. Takata, Cambridge, Mass., assignors, by mesne assignments, to the United States of America as represented by the Secretary of the Army
Filed Feb. 6, 1956, Ser. No. 563,588
9 Claims. (Cl. 343—5)

This invention relates in general to radar systems and in particular to relatively low cost, compact and transportable radar apparatus selectively operable in either precision approach or air surveillance service, wherein cost, weight and space are conserved through extensive utilization of essential components in the performance of both functions. The present system provides means for effecting reliable transition from precision approach to air surveillance operation and vice versa, at a rate consistent with the demands imposed by the high traffic density of the modern airport, without sacrifice of those characteristics most essential to portable, tactical use of the equipment.

Broadly speaking, a precision approach radar (PAR), associated with a ground controlled approach (GCA) system functioning as a low-visibility aircraft landing aid, consists of a radar arranged alternately to search through intersecting horizontal and vertical sectors in a selected volume of space. Through appropriate electronic circuitry the vertical searching, or elevation antenna, displays the range of an aircraft under observation and its relationship to a predetermined course line known as the glide slope. In a corresponding manner, the horizontal or azimuth antenna provides an indication of the range and left-right deviation of the aircraft from a course defined by an extension of the runway centerline and known as the localizer path. Details of a precision approach radar system, and the manner of sighting and use applicable to the present system are found in a copending application of Cole, Levin and Repella, Serial No. 487,372, filed February 10, 1955, entitled Radar Guidance Apparatus.

An air surveillance radar (ASR) system utilizes a continuously rotating azimuth antenna and associated electronic circuitry to indicate the position of aircraft within a region centered about the antenna. One type of GCA system includes a separate ASR for establishing initial radar contact with inbound aircraft. Vectoring instructions are then relayed to the aircraft to guide its movement into the relatively small region covered by PAR. While the apparatus disclosed in the aforementioned copending application provides a radar coverage more extensive than obtainable with prior art PAR systems, a considerable volume of space surrounding the airport terminal area remains unsearched with PAR alone. The desirability of air surveillance is apparent, but the added expense of acquiring a separate ASR unit is not justified for an airport having relatively low traffic density. Further, the additional bulk is disadvantageous when it is desired to move the system at frequent intervals, a situation often encountered in military operations utilizing landing strips whose location changes to conform with operational requirements.

Accordingly, it is a primary object of the present invention to provide an integrated radar system capable of selectively furnishing accurate output data in either precision approach or air surveillance service.

Another object of this invention is to provide a precision approach-air surveillance radar combination wherein the transition to the desired mode of operation may be achieved with a minium of time loss, thus enhancing overall system safety while materially increasing the traffic volume which may be controlled within a given time interval.

Another object is to provide a radar antenna system in accordance with the foregoing object which to the largest extent possible utilizes necessary components in both modes of operation, thus minimizing equipment first cost, space and gross weight.

Still another object of this invention is the provision of apparatus to enable a radar antenna system to be rapidly switched between air surveillance and precision approach functions in a manner which precludes damage or excessive wear being sustained by mechanical or electrical components therein.

A further object of the present invention is to provide a mechanism compactly arranged for selectively connecting the azimuth antenna of the system to rotary-to-oscillatory coupling means whereby the increase in inertia introduced by the selecting mechanism into the system associated with the oscillating azimuth antenna is negligible.

Another object is to effectively damp the sources of mechanical power during the changeover between precision approach and air surveillance operation to effect a smooth rapid changeover.

Another object is the provision of means for sensing proper alignment between the azimuth antenna and rotary-to-oscillatory coupling means before coupling the latter to the former.

Still another object is to prevent application to the azimuth antenna of motive power tending to simultaneously impart both oscillatory and rotary motion thereto.

Another object is to provide means for setting a waveguide switch in a position which enables the azimuth antenna to be energized when the system is utilized for air surveillance.

An object is to utilize a single electrically-controlled power source to effect both the disconnection of rotary-to-oscillatory coupling means from said antenna and the connection thereto of rotary coupling means, the same power source also controllable to effect the reverse operation.

A further object is the provision of a mechanical coupling arrangement for connecting rotary-to-oscillatory coupling means to the azimuth antenna, despite imperfect alignment between the antenna and the coupling means, thereby reducing the error sensitivity required of an electromechanical servo system for aligning the antenna and coupling means. The time for rough alignment by the servo system is accordingly reduced.

In a broad aspect the invention resides in the provision of first and second antennas arranged to selectively search a pair of sectors in first and second mutually perpendicular planes respectively, and a sector in said first plane larger than either of said pair.

More particularly, the invention comprises an antenna housing with azimuth and elevation antennas attached thereto and means within said housing for facilitating the search of sectors in horizontal and vertical planes with said azimuth and elevation antennas respectively or searching through a complete circular sector in the horizontal plane with said azimuth antenna alone.

A preferred embodiment described herein includes elevation and azimuth antennas mounted on an antenna housing whereby they are rotatable about horizontal and vertical axes respectively. A source of motive power is selectively coupled to both antennas by rotary-to-oscillatory coupling means and to the azimuth antenna by rotary coupling means. A waveguide switch, which selects the antenna to be energized, is synchronized with the rotary-to-oscillatory coupling means to alternate energization of the antennas. Means are provided for setting the waveguide switch to energize only the azimuth antenna when the latter is coupled to the source of motive power by the rotary coupling means.

These and other objects and advantages will become apparent from the following specification when read with reference to the accompanying drawings in which.

Figure 1:
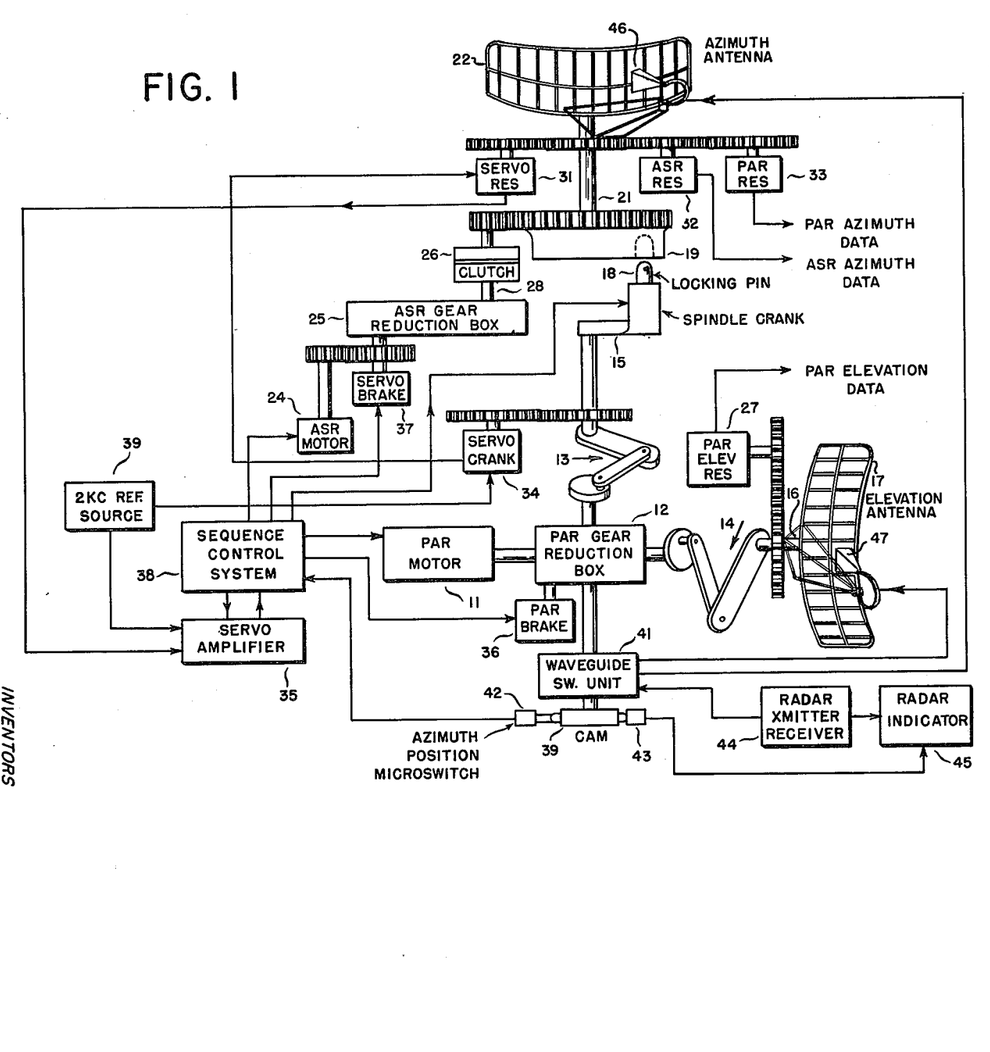
FIG. 1 is a combined block-pictorial diagram of the novel system.

With reference now to the drawings and more particularly FIG. 1 thereof, there is illustrated a combined block-pictorial diagram of the novel antenna system. To facilitate understanding the system operation, the physical relationship between system components will first be described. A precision approach motor 11 drives gear box 12 which in turn is connected by a pair of rotary-to-oscillatory couplings 13 and 14 to crank 15 and elevation spindle 16 respectively, elevation spindle 16 supporting elevation antenna 17. Extension of locking pin 18 effects the locking of crank 15 to gear 19 secured to azimuth spindle 21, to which azimuth antenna 22 is affixed.

Air surveillance motor 24 is mechanically coupled through gear box 25 to clutch 26, which, when engaged, mechanically couples the output shaft 28 of gear box 25 to azimuth spindle 21. The rotor of elevation resolver 27 is geared to elevation spindle 16, while the rotors of spindle servo resolver 31, ASR resolver 32, and PAR resolver 33 are all geared to azimuth spindle 21. The rotor of crank servo resolver 34 is mechanically coupled to spindle crank 15 and electrically coupled to spindle servo resolver 31, the output of spindle servo resolver 31 being electrically coupled to servo amplifier 35. A PAR brake 36 is coupled to gear box 12 for applying drag to the oscillatory motion of the antennas when changing to ASR. Servo brake 37, coupled to gear box 25 serves to impede rotary motion of the azimuth antenna when the change to PAR is effected.

The sequence control system 38 is operable in response to selection of a change in the mode of system operation between precision approach and air surveillance. System 38 controls the energization of motors 11 and 24 and servo amplifier 35. It also responds to control signals from the latter.

A waveguide switch 41, mechanically coupled to gear box 12, guides microwave energy between radar transmitter-receiver 44 and alternately feedhorns 46 and 47 of azimuth antenna 22 and elevation antenna 17 respectively during precision approach operation, and feedhorn 46 of azimuth antenna 22 alone during air surveillance operation. Microswitch 42 responsive to the position of waveguide switch 41 is coupled to control system 38 for supplying said system with waveguide switch positional information. Microswitches 43 (only one is shown in FIG. 1), also responsive to the position of waveguide switch 41, are coupled to the radar indicator 45 for providing a signal characteristic of the antenna then energized when the system is being used for precision approach. Cam 39 actuates microswitches 42 and 43.

Figure 2:
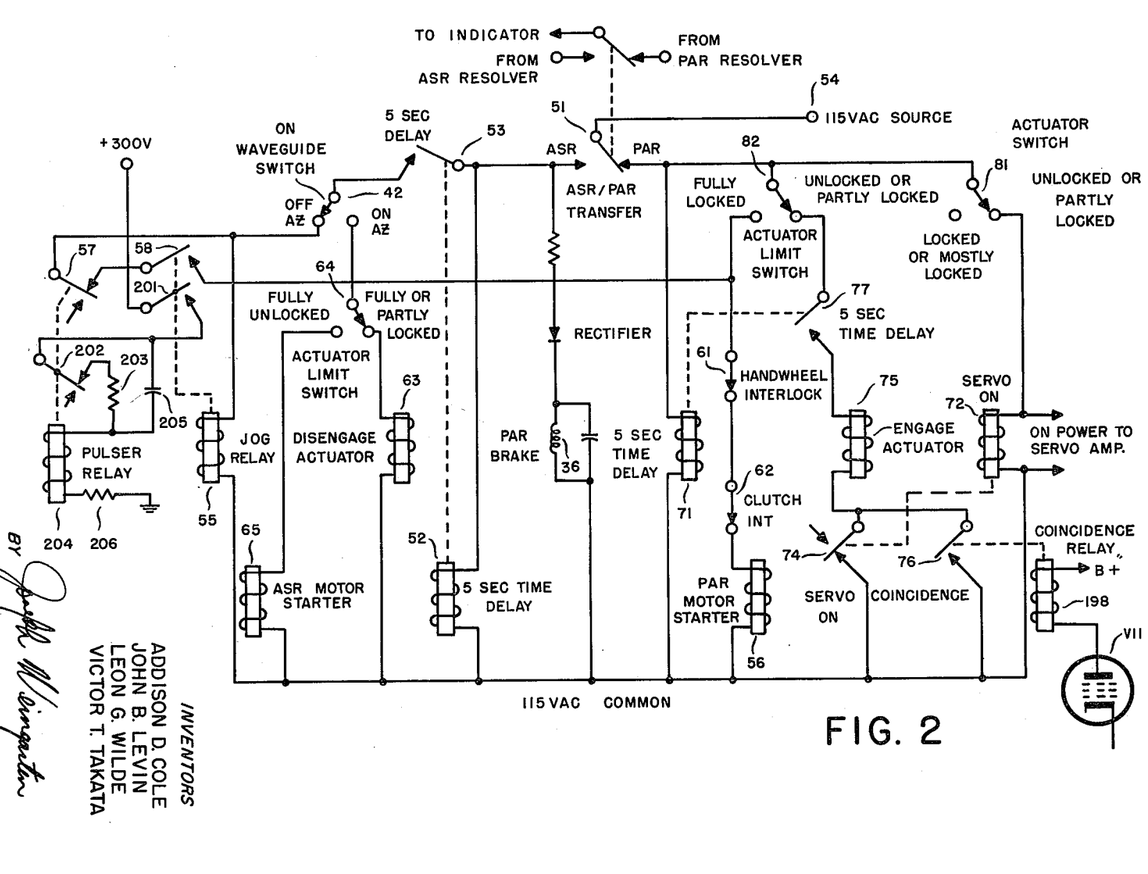
FIG. 2 is a schematic diagram of the sequence control system for regulating the sequence of steps during the changeover period.

Having described the physical connections between the various elements in the system, it is now appropriate to describe in detail system operation when changing between precision approach and air surveillance operation. FIG. 2 is a schematic circuit diagram of sequence control system 38 which has been divided into FIGS. 3 and 4 to facilitate understanding the operation of the system elements of FIGS. 1 and 2 during the changeover period.

Reference numerals associated with elements common to a plurality of drawings are retained in all drawings.

Figure 3:
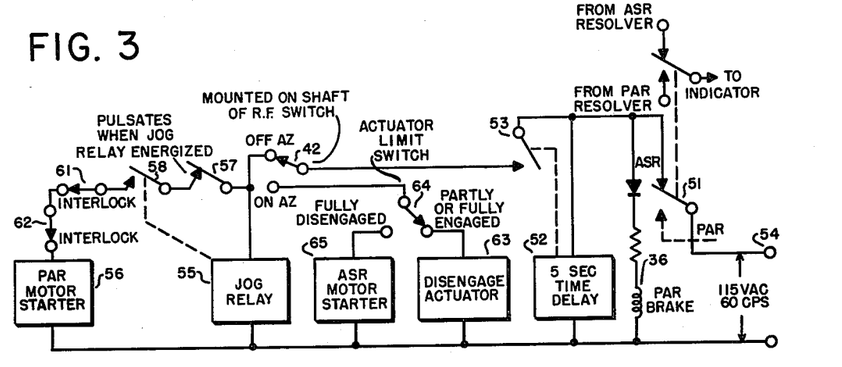
FIGS. 3 and 4 are block diagrams which facilitate understanding the switching system for changing the mode of operation.
Figure 4:
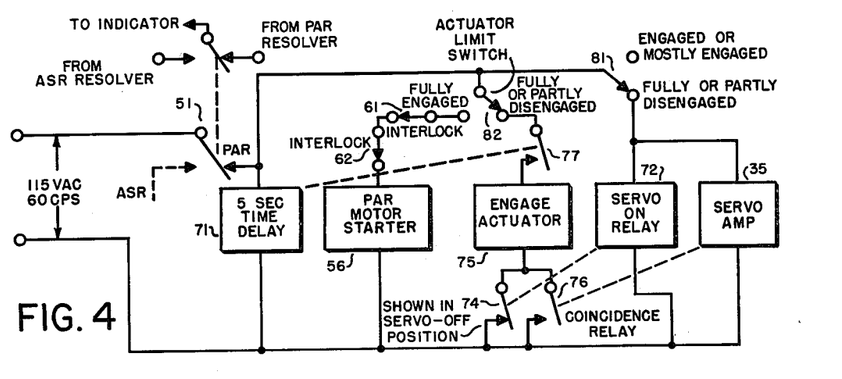

The description of the changeover cycles proceeds with specific reference to FIGS. 3 and 4 for clarity; however, elements which appear therein are also found with corresponding reference numerals in FIG. 2.

With reference now to FIG. 3, the change from precision approach to air surveillance operation will be described. Air surveillance operation is selected by moving switch 51 to the ASR position, thereby disconnecting precision approach resolver 33 from the radar indicator, connecting thereto search resolver 32, and energizing PAR brake 36 and delay relay 52. Brake 36 is effective to rapidly decelerate the oscillatory motion of antennas 17 and 22. After a five-second delay, switch 53 associated with delay relay 52 is closed, connecting the supply voltage applied at terminal 54 to microswitch 42, associated with waveguide switch 41 for indicating when azimuth antenna 22 is coupled to radar transmitter-receiver 44.

For search operation, the azimuth antenna is energized with microwave energy; therefor, means are provided for maintaining waveguide switch 41 in a position which couples microwave energy between azimuth antenna 22 and radar transmitter-receiver 44. To demonstrate the facility with which the system insures proper positioning of waveguide switch 41 prior to air surveillance operation, switch 42 is illustrated in FIGS. 2 and 3 in the position which corresponds to waveguide switch 41 being arranged to allow energization of only elevation antenna 17.

With switch 42 thus positioned, jog relay 55 is energized. This initiates operation of a pulser relay 204 (not shown in FIG. 3), whose operation is described in detail below, for energizing PAR motor starter 56 with bursts of energy through switches 57 and 58, handwheel interlock 61, and clutch interlock 62, thereby energizing precision approach motor 11 in a pulsating manner. The latter interlocks are discussed below. Motor 11 urges antennas 17 and 22 and waveguide switch 41 into a position whereby azimuth antenna 22 is energized with microwave energy. Then switch 42 moves to the on-azimuth position and jog relay 55 is deenergized. PAR brake 36 is effective in preventing overshoot when jog relay 55 is deenergized.

With switch 42 in the on-azimuth position, relay 63 is energized to effect the connection of a source of energy which disengages locking pin 18. Switch 64 (not shown in FIG. 1) is operated by movement of the locking pin 18. It prevents energization of air surveillance motor 24 until pin 18 is fully disengaged and clutch 26, linked mechanically to pin 18, is fully engaged. Clutch interlock 62 remains open with clutch 26 engaged, thereby preventing PAR motor 11 from being inadvertently started. Then switch 64 is moved to the fully unlocked position, permitting energization of ASR motor starter 65 which starts air surveillance motor 24. The motion of the latter is imparted by rotary coupling means, described in detail below, to azimuth antenna 22 to effect continuous rotation thereof.

With reference now to FIG. 4, operation of the apparatus for a change from air surveillance to precision approach operation will be described. Selection of precision approach operation commences with movement of switch 51 to the PAR position, substituting precision approach resolver 33 for search resolver 32 as a source of an azimuth antenna positional data signal for the radar indicating apparatus. Simultaneously, delay relay 71, servo on relay 72, and servo amplifier 35 are energized. With servo on relay 72 energized, its associated switch 74 is opened, thereby preventing the premature engagement of actuator pin 18 by precluding engage actuator relay 75 from becoming energized. A signal from servo amplifier 35 is effective in selecting appropriate control relays (FIG. 6) so that air surveillance motor 24 is energized with electrical power properly connected to induce rotation in a direction which aligns gear 19 with crank 15 to permit their being locked together by pin 18. When such alignment has been obtained to within a predetermined tolerance, servo amplifier 35 is effective in energizing coincidence relay 198 (FIGS. 2 and 7) to close its associated switch 76. Then, delay relay 71 effects the closing of switch 77. Engage actuator relay 75 is now energized through switches 76 and 77 to enable locking pin 18 to engage crank 15 and gear 19. Note that this system arrangement avoids damage which might be incurred if pin 18 where prematurely engaged, by preventing the latter from moving into position until servo amplifier 35 indicates that alignment is correct to within the predetermined tolerance whereby a slot in gear 19 is positioned to accept pin 18. The closing of switch 74 enables the actuator relay 75 to be energized while pin 18 moves to the fully locked position, after servo amplifier 35 has been deenergized.

Switch 81 functions to deenergize servo-on relay 72 and consequently servo amplifier 35 when the pin is mostly engaged; that is, the tip of the pin has just entered the groove. This permits the final alignment entirely by mechanical means without interference from the servo system; i.e., locking pin 18 urges gear 19 to move until slot and pin are properly aligned as the pin moves inward. When the pin is fully engaged, the actuator limit switch 82, also associated with locking pin 18 is moved into the fully engaged position, thereby enabling PAR motor starter 56 to be energized through interlocks 61 and 62 which in turn initiates the operation of precision approach motor 11, returning the system to precision approach operation. Interlock 61 prevents PAR motor 11 from being energized when a handwheel for manually moving the antennas engages the gears in gear box 12.

With reference to FIG. 2, the circuit means is there illustrated for effecting the periodic actuation of switch 57, discussed above in connection with the earlier description of FIGS. 2, 3 and 4. Energization of jog relay 55 closes switch 201, energizing relay 204 through initially discharged capacitor 205 and resistor 206 which opens switches 202 and 57. When the potential across relay 204 drops below the hold-in value as capacitor 205 charges, switches 202 and 57 close and capacitor 205 discharges through resistor 203. Then relay 204 is again energized through capacitor 205 and the foregoing sequence is repeated until jog relay 55 is deenergized, corresponding to waveguide switch 41 positioned to couple microwave energy between azimuth antenna 22 and radar transmitter-receiver 44 (FIG. 1).

Figure 5:
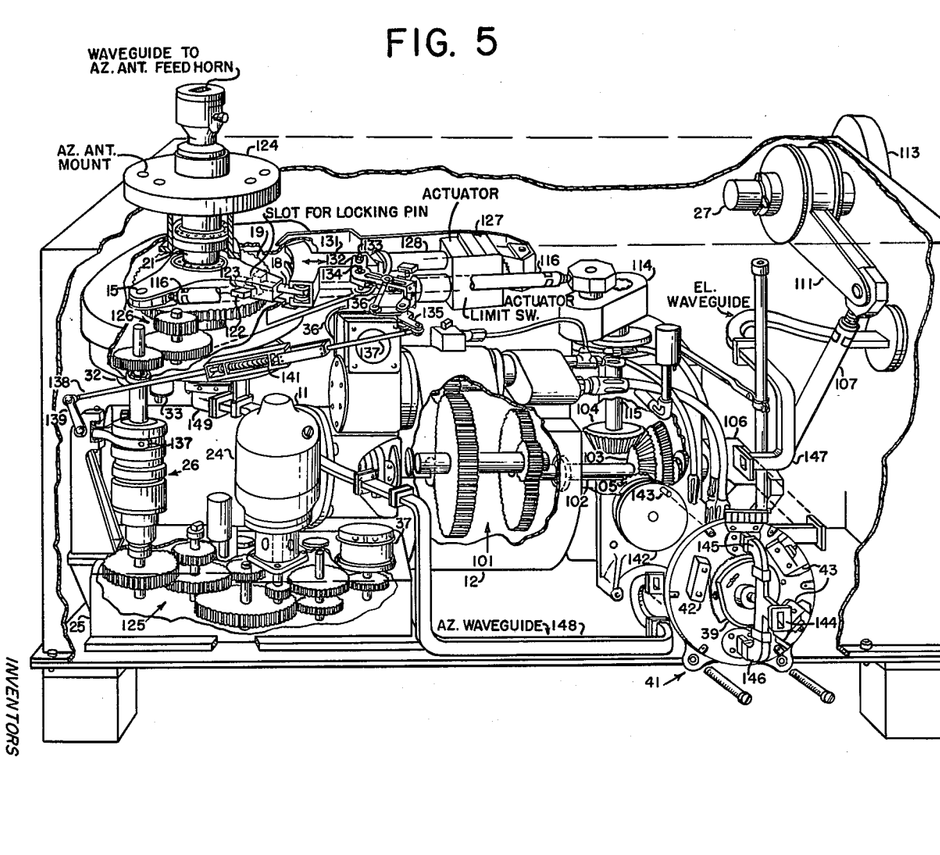
FIG. 5 is a pictorial drawing illustrating the antenna drive mechanism and related components.

Referring now to FIG. 5, a cutaway drawing of the antenna housing unit shows the physical arrangement of mechanical components described in FIGS. 1, 2, 3 and 4. To better illustrate the arrangement, some portions of the apparatus are shown in exploded views while others are cut away to reveal details otherwise hidden. Precision approach motor 11 powers drive shaft 102 through reduction gears 101 in PAR gear box 12. Bevel gear 103 imparts the rotary motion of shaft 102 about axes mutually perpendicular thereto by means of bevel gears 104 and 105. Elevation crank 106 is secured to shaft 102 and has pivotally attached thereto elevation linkage 107. To convert the rotary motion of shaft 102 to oscillatory motion, the pivotal point of attachment moves in a circular path around shaft 102. The other end of link 107 is pivotally attached to member 111 which is affixed to rotatively mounted elevation spindle 16 (not visible in FIG. 5) to which elevation antenna mount 113 is rigidly secured. Elevation antenna 17 (not shown here) is attached to mount 113. The rotary motion of bevelled gear 104 is converted to oscillatory motion in a similar manner by pivotally attaching opposite ends of link 116 to spindle crank 15 and azimuth crank 114 respectively, shaft 115 coupling azimuth crank 114 to bevelled gear 104. A portion of link 116, which obstructs apparatus described below, is cut away in FIG. 5 and dotted lines substituted therefor as an aid to visualizing the actual position of the link. Crank 15 is rotatable about the axis of spindle 21 to which gear 19 is rigidly secured. Affixed to gear 19 is a slotted block 122 aligned on a circle concentric about the axis of azimuth spindle 21, the one dimension of the slot being positioned along a radial line emanating from and orthogonal to said axis while its width is sufficient to accommodate the entry of locking pin 18. A slot 123 in crank 15 allows the passage of block 122 therethrough when the system is utilized for air surveillance and gear 19 is continuously rotating with locking pin 18 unlocked. However, when the system is functioning as a precision approach radar, pin 18 resides in the slot of block 122, locking crank 15 to gear 19 whereby the two move together. Azimuth antenna mount 124, securely connected to azimuth spindle 21, is constrained to follow the motion of gear 19. Thus, with pin 18 unlocked and clutch 26 engaged as shown, in a manner described below, energization of air surveillance motor 24 is effective to impart rotary motion to gear 19 and mount 124 through the reduction gears 125 and 126 and clutch 26. Conversely, with actuator pin 18 locked and clutch 26 disengaged, energization of precision approach motor 11 is effective to impart oscillatory motion to gear 19 and mount 124 through spindle crank 15, link 116, azimuth crank 114, shaft 115, bevelled gears 103 and 104, shaft 102 and gear box 12.

In the preferred embodiment the source of mechanical power for effecting the movement of locking pin 18 is an actuator 127 powered by a reversible motor which rotates through a suitable gearing, a threaded bore accommodating the threaded end of shaft 128. Thus, the motor may induce rotation of the threaded bore to contract or extend shaft 128. Attached to shaft 128 is crescent 131 having a grooved rail to accommodate locking pin 18 as spindle crank 15 oscillates. This arrangement is especially advantageous because elements which position pin 18 move only during the period the system is changed between ASR and PAR. Consequently, they add no mechanical drag to the antenna drive system and no space need be reserved within the housing to accommodate their oscillation, thereby effecting a compact arrangement of the apparatus. Furthermore, the arrangement facilitates the ease with which a mechanical linkage may be connected between clutch 26 and crescent 131 to enable actuator 127 to concurrently control the movements of both locking pin 18 and clutch 26. The forked end of elbow member 132 encloses pin 133, secured to crescent 131 whereby movement of the latter induces rotation of elbow member 132 about pin 134. Movement of member 132 is coupled to a pivotally mounted elbow link 135 by link 136. Movement of link 135 is coupled to arm 139 by links 137 and 138 and clutch actuator overtravel unit 141, the latter serving to accommodate overtravel of link 137 beyond that required to engage clutch 26. Movement of arm 139 effects vertical movement of the forked end thereof 137, which is positioned in grooves of clutch 26 to effect engagement and disengagement of the latter. Downward movement results in engagement of the clutch while the reverse movement disengages the clutch.

In the lower right hand corner of FIG. 5, there is shown a partially exploded view of waveguide switch 41 together with associated components. Drive coupling disk 142 is connected by a shaft to bevelled gear 105, whereby its movement is synchronized with the rotation of shaft 102, and consequently the oscillation of elevation and azimuth antennas when functioning for precision approach. Pin 143 couples the rotation of disk 142 to a semicircular rotatable conductive disk (not shown). Microwave energy incident at the input waveguide 144 is channeled through branches 145 anad 146 to waveguides 147 and 148 respectively, the former coupling energy to elevation antenna 27 and the latter, to azimuth antenna 22 via rotary joint 149. The aforesaid rotating semi-circular disk (not shown) driven by disk 142 obstructs the openings of waveguides 145 and 146 during alternate time intervals, thereby directing energy to only one antenna at a time. By selecting the length of sections 145 and 146 from the semi-circular disk to the junction of the sections to be substantially one-fourth the guide wave length of the microwave energy, that section whose opening is then obstructed by the said semi-circular disk and thereby shorted thereat presents a substantially infinite impedance at the junction of guides 144, 145 and 146. Thus, nearly all the microwave energy incident at said junction is directed to one antenna for useful radiation, thereby attaining maximum radar range from the available microwave power.

Microswitches 43 are actuated by movement of cam 39, the latter cam also operating microswitch 42. A gating signal is derived from microswitches 43 for use by the radar indicator to derive a signal characteristic of the antenna then energized. The cam is effective in changing the switch position of microswitches 43 in synchronism with a change in the waveguide section obstructed by the semi-circular disk, and therefore, a change in the antenna then energized. The position of microswitch 42 is utilized by control system 38 in the manner described above for ascertaining that azimuth antenna 22 is energized when the system is functioning for air surveillance. Elevation resolver 27 provides an elevation positional data signal for the indicating apparatus which is characteristic of the instantaneous angular position of the elevation antenna. Search resolver 32 and precision approach servo resolver 33, visible below reduction gears 126, and spindle servo resolver 31, not visible in FIG. 5, are coupled to spindle 21 by a one:one gear ratio. Thus, each of the last-mentioned resolvers provides a signal characteristic of the angular position of azimuth antenna 22. In a similar manner, spindle crank servo resolver 34, not visible in FIG. 5, is coupled by a one:one gear ratio to spindle crank 15.

Toward the center of FIG. 5, PAR brake 36 and servo brake 37 are illustrated coupled to respective reduction gear trains. These brakes are preferably of the magnetic type, which when energized, exert a drag on moving antennas through the respective gear trains.

Figure 6:
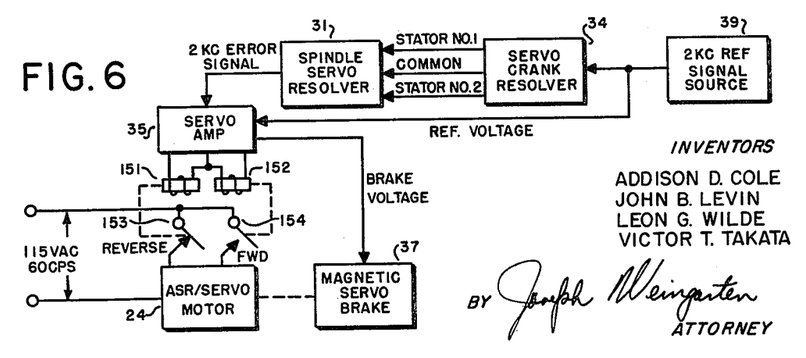
FIG. 6 is a block diagram of the servo system.

With reference now to FIG. 6, there is illustrated a block diagram of the servo system for aligning gear 19 with spindle crank 15. Reference source 39 energizes the rotor of servo crank resolver 34, thereby inducing signals in the two stator windings, oriented in space quadrature, having magnitudes related respectively to the sine and cosine of the angle subtended by the axes of the rotor coil and one of the stator windings. The stator windings are connected to corresponding stator windings of spindle servo resolver 31, also oriented in space quadrature to induce a resultant magnetic field which is angularly spaced with respect to the stator windings by the same angle as the rotor axis of resolver 34 spaced with respect to its stator windings. Thus, when the axis of the rotor of spindle servo resolver 31 is in space quadrature with the induced magnetic field, no voltage is derived across the rotor winding of resolver 31, signifying alignment of crank 15 and gear 19. The latter rotor winding signal is the error signal and is in phase with the reference signal when misalignment is in one direction and of opposite phase thereto when misalignment is in the opposite direction.

Servo amplifier 35 responds to the error signal by energizing either relay 151 or 152, thereby closing one of the respective switches 153 or 154, to effect the energization of a field of ASR motor 24 which induces rotation tending to align gear 19 with crank 15. When the error is less than a predetermined magnitude servo brake 37 is heavily energized to stop movement of gear 19 and associated components.

Figure 7:
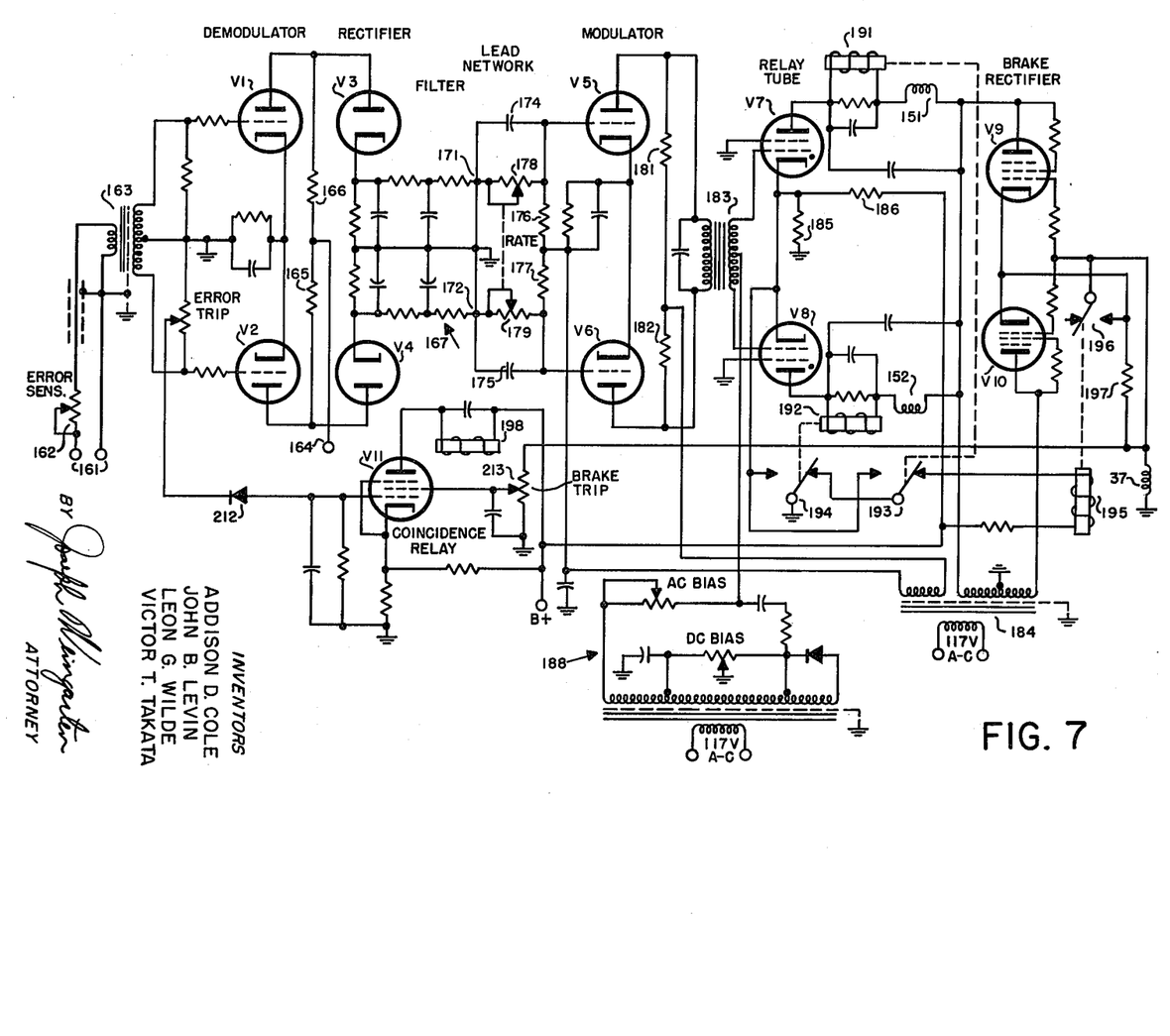
FIG. 7 is a schematic circuit diagram of the servo amplifiers.

Referring now to FIG. 7, there is illustrated a schematic circuit diagram of servo amplifier 35. Basically, it comprises a demodulator which is energized by the error signal from spindle servo resolver 31, and the source 39 of the two kc. signal which also energizes crank servo resolver 34. The demodulated signal is rectified and filtered and applied to a lead network. The output signal from the lead network modulates a 60 cycle signal. A phase and amplitude sensitive relay-tube system responds to the modulated signal to supply energy to air surveillance motor 24 of a proper polarity to align gear 19 with crank 15 whereby locking pin 18 may lock gear 19 to crank 15. When an error of less than a predetermined value is indicated, coincidence relay 198 is energized, thereby allowing locking pin 18 to be engaged as described above.

Having generally discussed the operation of servo amplifier 35, it is appropriate to describe in detail the functioning of the circuit. An error signal is applied from spindle servo resolver 31 to input terminals 161, said error signal being adjustably attenuated by error potentiometer 162 before application to the input terminals of transformer 163 to permit control of the sensitivity of the apparatus to error. Crank servo resolver 34 and spindle servo resolver 31 are so arranged and interconnected that alignment of gear 19 and crank 15 maintains the relative position of the resolver rotors oriented to effect substantially complete attenuation of the reference signal applied to resolver 34, misalignment being characterized by a signal having an amplitude characteristic of the degree of misalignment. The sense of a misalignment indicating signal with respect to the reference signal is indicative of the direction of misalignment. Tubes V1 and V2 are arranged in a balanced demodulator circuit whereby the grids thereof are energized out of phase by transformer 163 and their plates in phase by the reference signal incident at terminal 164. Thus, when the error and reference signals are in phase, the demodulated output signal amplitude across resistor 166 is greater than that across resistor 165, while reference and error signals of opposite phase provide a greater signal across resistor 165. Rectification of the output signals by tubes V3 and V4 followed by the filtering of network 167 results in a direct potential being applied at terminals 171 and 172, whose relative polarity is dependent upon the relative phase of error and reference signals. Capacitors 174 and 175, in cooperation with resistors 176 and 177 respectively, serve as differentiating networks to energize the grids of V5 and V6 respectively with a signal characteristic of the rate of change of the rectified error signal. The latter rate signal is effectively added to the attenuated rectified error signal derived from the voltage divider comprising resistors 176 and 177 in cooperation with potentiometers 178 and 179 respectively, the latter potentiometers being ganged to control the degree of damping of the servo system by controlling the amplitude of the signals applied to modulator tubes V5 and V6 respectively.

The plates of modulator tubes V5 and V6 are energized with 60 cycle alternating current. When the error signal is zero, the grids of the latter tubes are at substantially the same potential, resulting in equal amplitude signals across resistors 181 and 182 respectively; hence, there is virtually no signal voltage across the primary of transformer 183. When the grid potentials of V5 and V6 are different, a signal appears across the primary of transformer 183 of a first phase if potential on the grid of V5 is higher, and of opposite phase if the potential on the grid of tube V6 is higher.

The signal across the secondary of transformer 183 has amplitude and phase related respectively to magnitude and sense of the error signal. Since the grids of thyratrons V7 and V8 are energized from the secondary with signals of opposite phase, the only thyratron fired is the one having applied to its plate a signal in phase with the signal on its respective grid. The plates of V7 and V8 are energized in phase by transformer 184. Resistors 185 and 186 form a voltage dividing network which biases V7 and V8 in cooperation with A.C.-D.C. biasing network 188 to prevent either tube from firing until the applied grid signal exceeds a predetermined magnitude, corresponding to alignment of gear 19 and crank 15 within the desired tolerance. When neither tube is conducting relays 191 and 192 are deenergized, thus positioning their associated switches respectively, 193 and 194, as shown to energize relay 195, whereby its associated switch 196 is moved to the position which shorts out biasing resistor 197 to markedly increase the current which flows through servo brake 37 and brake rectifier tubes V9 and V10. Thus, the effect of the servo braking system is to provide an immediate damping effect on the rotating azimuth antenna when servo amplifier 35 is energized and bring it to a complete halt when alignment is proper for inserting locking pin 18.

When thyratron V7 or V8 has fired, the direct current therethrough energizes relay 151 or 152 respectively which effects the energization of the proper field in ASR motor 24 to induce rotation thereof in a direction tending to align gear 19 and spindle crank 15.

The D.C. bias supplied to V7 and V8 is effectively removed by the closing of switch 193 or 194 when a tube has fired, and less signal is required on the following cycle to ignite the tube. Thus, relay chatter and other instabilities, inherent when the input signal is barely sufficient to fire the tubes, is virtually eliminated by providing this differential between firing and extinguishing signals. Removal of the D.C. bias does not affect the non-firing tube since the signal then applied to its grid is effective in maintaining the tube in the extinguished condition.

The plate current of tube V11 flows through coincidence relay 198, but is insufficient to actuate the latter until the grid and screen potentials of tube V11 have risen above a predetermined level. Diode 212 rectifies the error signal to provide a negative grid biasing potential proportional to the magnitude of the error signal. When the error signal becomes less than a selected value, the grid potential is sufficiently high to increase the flow of tube V11 plate current, provided the screen potential is above the selected value. However, the screen potential, supplied through potentiometer 213 from brake 37, remains relatively low until the brake current increases at which time ASR motor 24 is deenergized, gear 19 and crank 15 are aligned, and coincidence relay 198 is actuated to close associated switch 76 (FIGS. 2 and 4) thereby effecting the insertion of locking pin 18. The system is preferably arranged so that the rise in screen potential occurs after the error signal has become less than the selected level. Thus, actuation of coincidence relay 198 is substantially synchronous with stoppage of ASR motor 24 at which time alignment of gear 19 and crank 15 is sufficient to allow their connection by locking pin 18, resulting in the changeover occurring in the minimum practicable time without damage or excessive wear to the system components.

In a representative embodiment the antenna drive system constructed in the manner described above, is contained within the antenna housing substantially of the form illustrated in FIG. 1 of the co-pending application of Cole, Levin and Repella, mentioned above. The structural supports and reversibility features of the antennas as described in the aforesaid co-pending application are retained in the present system, together with the prior sighting and precision approach operational techniques. The system is operable in the air surveillance mode from any site selected.

Thus, the invention provides data for relaying complete guidance information to an aircraft from the time of entry into the airport terminal area until the landing operation is complete. In a typical landing operation, the air surveillance function is selected and the observed data utilized to vector the aircraft from its entry point into the terminal area to the region scanned by the system when functioning for precision approach. Upon entry of the aircraft into the precision approach region, the operator selects the precision approach function and within six to eight seconds observes the aircraft position on the indicator relative to the proper landing path. Upon guiding the aircraft to the runway touchdown point, the operator again selects air surveillance and within six seconds the apparatus is ready to accommodate another complete landing operation. Only a single controller is required to control the complete guidance operation.

While the indicator is not a part of the present invention and may comprise separate cathode ray tubes for displaying radar targets when used for precision approach and air surveillance, it is preferably of a type which utilizes a single cathode ray tube of the type disclosed in FIG. 1 of the co-pending application of Levin, Repella and Rosen, Serial No. 512,665, entitled Radar Data Processing, filed June 2, 1955, now Patent No. 2,964,745. A beta-scan display, as illustrated therein, is preferable when precision approach has been selected, and a P.P.I. display when air surveillance has been selected.

While the particular embodiment described herein has many features and advantages, numerous modifications thereof and departures therefrom may be made by one skilled in the art without deviating from the inventive concepts disclosed herein. Consequently, the invention is to be construed as limited only by the spirit and scope of the appended claims.

What is claimed is:

1. In a combined precision approach and air surveillance radar system having elevation and azimuth antennas rotatable in mutually perpendicular planes, apparatus comprising precision approach and air surveillance motors, elevation and azimuth spindles secured to the respective antennas, spindle servo, air surveillance, and precision approach resolvers mechanically coupled to said azimuth spindle, a gear box connected to said precision approach motor, a spindle crank connectible to said azimuth spindle by means including a slidable locking pin, a crank servo resolver mechanically coupled to said crank, a pair of rotary-to-oscillatory linkages for respectively connecting said spindle crank and said elevation spindle to said gear box, a waveguide switch mechanically coupled to said gear box, a clutch which effects mechanical coupling between said air surveillance motor and said azimuth spindle when engaged, a linkage between said locking pin and said clutch whereby said pin in a first position effects mechanical coupling between said crank and said azimuth spindle and said clutch is disengaged, and in a second position disconnects mechanical coupling between said crank and azimuth spindle and said clutch is engaged, a servo amplifier, means for coupling said spindle servo resolver to said crank servo resolver and said crank servo resolver to said servo amplifier, and a sequence control system having an input coupled to said servo amplifier and outputs coupled to said air surveillance and precision approach motors.

2. In a combined precision approach and air surveillance radar system having elevation and azimuth antennas rotatable in mutually perpendicular planes, apparatus comprising precision approach and search motor, a precision approach brake, a selector switch for selecting said system for operation either as a precision approach or air surveillance radar, means for deenergizing said precision approach motor and energizing said precision approach brake in response to selecting precision approach operation with said selector switch, delay means operative in response to actuation of said selector switch, a waveguide switch for selectively channelling microwave energy to said elevation and azimuth antennas, a microswitch responsive to the position of said waveguide switch and indicative of the antenna to which said microwave energy is channelled, means for energizing said precision approach motor after a time interval determined by said delay means when said microswitch indicates said elevation antenna is energized with said microwave energy, rotary-to-oscillatory coupling means which converts rotary motion of said precision approach motor to oscillating motion of said antennas, means for disconnecting said coupling means from said azimuth antenna when said microswitch indicates the azimuth antenna is energized with microwave energy, means for coupling said air surveillance motor to said azimuth antenna in response to the disengagement of said azimuth antenna from the rotary-to-oscillatory coupling means, and means for energizing said air surveillance motor whereby rotary motion is imparted to said azimuth antenna.

3. In a combined precision approach and air surveillance radar system having elevation and azimuth antennas rotatable in mutually perpendicular planes, apparatus comprising precision approach and air surveillance motors, means for mechanically coupling said air surveillance motor to said azimuth antenna, a selector switch for selecting said system for operation as an air surveillance radar, delay means operative in response to actuation of said switch, a crank associated with rotary-to-oscillatory coupling means disengageable between said precision approach motor and said azimuth antenna, crank and spindle servo resolvers mechanically coupled respectively to said crank and the spindle connected to said azimuth antenna and providing a positional signal characteristic of the orientation of said spindle with respect to said crank, a servo amplifier which provides an output signal in response to said positional signal to effect energization of said air surveillance motor whereby said spindle is oriented in a predetermined position with respect to said crank, means operative after an interval determined by said delay means for coupling said crank to said azimuth antenna when the two are aligned in the predetermined relation and decoupling said air surveillance motor from said azimuth antenna, and means for energizing said precision approach motor, thereby imparting oscillatory motion to said antennas.

4. In a combined precision approach and air surveillance radar system having elevation and azimuth antennas rotatable in mutually perpendicular planes, apparatus comprising, precision approach and air surveillance motors, a precision approach brake, a selector switch for selecting said system for operation either as a precision approach or air surveillance radar, means for deenergizing said precision approach motor and energizing said precision approach brake in response to selecting precision approach operation with said selector switch, first delay means operative in response to actuation of said selector switch to a position selecting air surveillance operation, a waveguide switch for selectively channelling microwave energy to said elevation and azimuth antennas, a microswitch responsive to the position of said waveguide switch and indicative of the antenna to which said microwave energy is channelled, after a time interval determined by said first delay means, means for energizing said precision approach motor when said microswitch indicates said elevation antenna is energized with microwave energy, rotary-to-oscillatory coupling means for coupling rotary motion of said precision approach motor to oscillating motion of said antennas, means for disengaging said rotary-to-oscillatory coupling means from said azimuth antenna when said microswitch indicates said azimuth antenna is energized with microwave energy, means for coupling said air surveillance motor to said azimuth antenna in response to the disengagement of said azimuth antenna from the rotary-to-oscillatory coupling means, means for energizing said air surveillance motor whereby rotary motion is imparted to said azimuth antenna, second delay means operative in response to actuation of said selector switch to a position selecting precision approach operation, a spindle crank associated with said rotary-to-oscillatory coupling means disengageable between said precision approach motor and said azimuth antenna, crank and spindle servo resolvers mechanically coupled respectively to said spindle crank and the spindle connected to said azimuth antenna and providing a positional signal characteristic of the orientation of said spindle with respect to said spindle crank, a servo amplifier which provides an output signal in response to said positional signal to effect energization of said air surveillance motor whereby said spindle is oriented in a predetermined position with respect to said crank, after a time interval determined by said second delay means, means for rigidly connecting said spindle crank to said spindle when the two are aligned in a predetermined relation and decoupling said air surveillance motor from said azimuth antenna, and means for energizing said precision approach motor, thereby imparting oscillatory motion to said antennas.

5. In a servo system for aligning members of a multipurpose radar antenna system, apparatus comprising, a source of a reference signal of a predetermined frequency, a source of an error signal of said fixed frequency characteristic of the misalignment between said members to be aligned, means for combining said error and reference signals to derive an error phase signal characteristic of the sense and magnitude of the misalignment, means for differentiating said error phase signal, means for combining said error phase signal with the differentiated error phase signal to provide a sum signal, a source of a second fixed frequency signal, means for modulating said second fixed frequency signal with said sum signal, a pair of gas discharge tubes each having at least a plate, cathode, and control electrode, first and second relay pairs each comprising serially connected brake and motor relays, each of said pairs serially connected between a respective gas discharge tube plate and said source of a second fixed frequency, an electromagnetic brake, a source of controllable brake current for energizing said brake, means for applying said modulated sum signal to said control grids whereby a selected one of said gas discharge tubes is rendered conductive when said error signal is greater than a predetermined magnitude, the selected tube being said first tube when error and reference signals are of the same phase and said second tube when said signals are of opposite phase, a source of motive power for moving at least one of said members to be aligned, first and second brake switches associated with said brake relays and actuated thereby for controlling the brake current from said source thereof to be relatively low when either brake relay is energized and relatively high when both brake relays are deenergized, and motor switches associated with said motor relays and actuated thereby, actuation of a motor switch in response to energization of its associated relay being effective to induce said source of motive power to bring said members into alignment.

6. Apparatus as in claim 5 which includes a source of D.-C. bias, and means for applying said bias to said gas discharge tubes and removing same when one of said tubes has fired, thereby obtaining positive firing of the ignited tube.

7. Apparatus as in claim 5 and including apparatus comprising, a current source tube having at least first and second control electrodes, a plate, and a cathode, a source of direct potential, a coincidence relay connected between said plate of said current source tube and said source of direct potential, means for connecting said brake to a control electrode of said current source tube whereby an increase of said brake current increases the plate current of said current source tube, means for rectifying said error phase signal to derive a D.-C. signal proportional to the degree of misalignment between said members, means for applying said D.-C. signal to the other control electrode of said current source tube whereby said current source tube plate current rises to a level sufficient to actuate said coincidence relay when said brake current is relatively high and said alignment error is less than a predetermined value, and means for rigidly connecting said members to be aligned in response to actuation of said coincidence relay.

8. In a combined air surveillance and precision approach radar system having elevation and azimuth antennas, air surveillance and precision approach motors, rotary-to-oscillatory coupling means connected between said precision approach motor and said elevation antenna and connectible between said precision approach motor and said azimuth antenna, a servo system comprising, a source of a reference signal, a first servo resolver for providing a signal characteristic of the position of said azimuth antenna, a second servo resolver for providing a signal characteristic of the position of said rotary-to-oscillatory coupling means, means for combining the resolver signals to derive an error signal characteristic of the relative position of said azimuth antenna with respect to said rotary-to-oscillatory coupling means, and a servo amplifier which combines said error and reference signals to derive a correction signal for effecting the energization of said air surveillance motor so as to align said azimuth antenna to bear a predetermined relation to said rotary-to-oscillatory coupling means and effect the connection of said rotary-to-oscillatory coupling means to said azimuth antenna when the predetermined relation is thereby obtained.

9. In a combined precision approach and air surveillance radar system, apparatus comprising, precision approach and air surveillance motors, a precision approach transmission driven by said precision approach motor, a magnetic precision approach brake mechanically coupled to said precision approach transmission, a first shaft driven by said precision approach transmission and having thereon an elevation crank, an elevation linkage pivotally attached to said elevation crank at a point which rotates about said shaft at one end and at the other end pivotally attached to an elevation arm which is secured to an elevation spindle, an elevation antenna mounting attached to said elevation spindle whereby rotary motion of said shaft is converted into oscillatory motion of said elevation antenna mounting, an elevation resolver having a rotor coupled to said elevation spindle to follow the oscillatory motion of said elevation antenna mounting, an elevation antenna attached to said elevation antenna mounting, said elevation antenna including an elevation feedhorn for illuminating the latter with microwave energy, a second shaft having attached thereto an azimuth crank and rotatively coupled to said first shaft, an azimuth spindle with an azimuth gear secured thereon, a spindle crank, rotatable about said spindle, a link pivotally attached at one end to said spindle crank and at the other end to said azimuth crank whereby rotary motion of said second shaft is converted to oscillatory motion of said spindle crank, a block secured to said spindle gear and positioned on a circle concentric about the axis of said spindle, a slot within said block and aligned along a radius of said circle, a groove within said spindle crank which accommodates the passage of said block, a bore within said crank alignable with respect to said radial slot and containing a slidable locking pin for selectively connecting said spindle crank to said azimuth gear, a slidable shaft with an actuator crescent attached thereto, a groove disposed within said actuator crescent disposed upon the sector of a circle substantially concentric about said spindle axis to provide a tangential movement of one end of said actuator locking pin about said spindle axis while constraining radial movement with respect thereto to conform to the sliding of said crescent, an actuator for moving said slidable shaft, an air surveillance transmission driven by said air surveillance motor for driving a servo brake and said spindle gear through coupling means including a clutch, a mechanical linkage, including a clutch actuator overtravel unit, for coupling the slidable movement of said actuator crescent to the engaging mechanism of said clutch whereby said clutch is disengaged when said actuator crescent is in a position locking said spindle gear to said spindle crank with said locking pin, and said clutch is engaged when said locking pin is positioned so as to allow movement of said spindle gear relative to said spindle crank, a clutch interlock switch operable in response to engagement and disengagement of said clutch, whereby said precision approach motor may be energized only when said clutch is disengaged, a waveguide switch having an input and first and second outputs for alternately channelling energy incident thereto to said first and second outputs, means for coupling rotary motion of said first shaft to rotary motion of a waveguide switch drive coupling which operates said waveguide switch, a switch cam mechanically coupled to said waveguide switch, an azimuth switch operated by the movement of said cam for providing waveguide switch positional information to a sequence control system to effect energization of said precision approach motor whereby said waveguide switch is positioned to channel microwave energy to the first output of said waveguide switch when air surveillance operation is selected, microwave coupling means including a rotary joint for coupling the first output of said waveguide switch to said azimuth feedhorn, and an elevation waveguide section between the second output of said waveguide switch and said elevation feedhorn.

References Cited in the file of this patent
UNITED STATES PATENTS
2,555,101    Alvarez ________________ May 29, 1951
FOREIGN PATENTS
498,227    Canada _________________ Dec. 8, 1953